United States Patent [19]

Gray et al.

[11] 4,380,252
[45] Apr. 19, 1983

[54] WIRE REINFORCED HOSE AND METHOD

[75] Inventors: Herbert W. Gray, Lawson; Roger A. Payne, Excelsior Springs, both of Mo.

[73] Assignee: The Gates Rubber Company, Denver, Colo.

[21] Appl. No.: 246,516

[22] Filed: Mar. 23, 1981

[51] Int. Cl.$^3$ .................. F16L 11/08; B32B 5/20
[52] U.S. Cl. .................. 138/125; 138/132; 138/DIG. 9; 156/79
[58] Field of Search ............. 138/125, 127, 133, 149, 138/DIG. 9, 144, DIG. 1, 132, 137, 138, 139, 138/141, 174, DIG. 7; 156/149, 79; 174/101.5, 174/110 F

[56] References Cited

U.S. PATENT DOCUMENTS

| | | |
|---|---|---|
| 2,128,814 | 8/1938 | Gish ........................ 138/56 |
| 2,879,803 | 3/1959 | Francois .................. 138/139 X |
| 3,130,753 | 4/1964 | Monnen .................. 138/138 X |
| 3,289,703 | 12/1966 | Brown ...................... 138/DIG. 9 |
| 3,383,258 | 5/1968 | Houlston ................. 138/DIG. 1 |
| 3,429,758 | 2/1969 | Young ..................... 156/79 |
| 3,547,162 | 12/1970 | Schaerer ................. 138/DIG. 9 |
| 4,044,799 | 8/1977 | Higbee et al. .......... 138/125 |
| 4,130,139 | 12/1978 | Haren ..................... 138/125 |
| 4,175,992 | 11/1979 | Grawey .................. 138/144 |
| 4,249,971 | 2/1981 | Yap et al. ............... 138/DIG. 9 |
| 4,306,591 | 12/1981 | Aterburn ................ 138/DIG. 1 |
| 4,351,366 | 9/1982 | Angioletti ............... 138/137 X |

FOREIGN PATENT DOCUMENTS 922116 3/1963 United Kingdom ......... 138/DIG. 9

OTHER PUBLICATIONS

*Lange's Handbook of Chemistry*, 4th Ed., Handbook Publishers, Inc., 1941, pp. 496 & 497.

Primary Examiner—Stephen Marcus
Assistant Examiner—Mark John Thronson
Attorney, Agent, or Firm—C. H. Castleman, Jr.; H. W. Oberg, Jr.; Raymond Fink

[57] ABSTRACT

A hose of improved impulse life is described including an inner polymeric tube which has a relatively hard outer surface, a tightly packed wire reinforcement e.g., braid or spiral, telescoped over the tube, and an expanded polymeric cushion matrix encapsulating at least a portion of the strands of the reinforcement and also promoting wire-to-wire and tube-to-wire adhesion. A method for producing the hose employing a foamable material applicator is also disclosed.

20 Claims, 7 Drawing Figures

WIRE REINFORCED HOSE AND METHOD

BACKGROUND OF THE INVENTION

This invention relates to wire reinforced hose articles, more particularly high pressure thermoplastic hydraulic hose and the like, and methods for their production.

Thermoplastic wire reinforced hose is widely used for hydraulic and other high pressure applications. This hose is generally constructed of a pre-cured or set thermoplastic tube which has substantial dimensional stability and a hard outer surface, onto which is telescoped one or more wire braid layers, and an outer protective cover. It is known that the kink resistance of wire or textile reinforced hydraulic thermoplastic hose can be improved by employing an adhesive between the tube and braid and/or between multiple braid layers, however, this practice has not been known to significantly improve impulse life of the hose. Even with the use of polymeric adhesives, impulse life of wire reinforced hose is oftentimes substantially less than required for many applications, apparently because individual wire strands of a beam of the braid during impulsing tend to abrade and/or fret as the wires rub and pantograph together. This causes premature wire fatigue.

It is a primary object of this invention to provide a wire reinforced polymeric hose with improved life principally by reducing wire fatigue, and to a method for producing a hose construction which in operation is characterized by reduced wire fatigue and longer impulse life. It is another object to provide wire reinforced thermoplastic high pressure hose, e.g., hydraulic hose, of significantly improved impulse life while also exhibiting excellent resistance to kink.

SUMMARY OF THE INVENTION

Briefly described, in one form the invention pertains to a hose including an inner polymeric tube, a tightly packed stranded wire reinforcement in the form of one or more layers telescoped over the tube, and an expanded polymeric cushion matrix (e.g., plastic foam) at least partially encapsulating strands of the reinforcement and filling at least a portion of interspaces between adjacent strands.

In a more limited form, the invention is directed to a hydraulic thermoplastic hose including a thermoplastic tube of at least about 75 (Shore A) durometer with a maximum internal diameter of about 2 inches; at least one wire braid reinforcement layer telescoped over the tube and free from embedment in the outer surface of the tube, the beams of the braid formed of multiple strands of wire positioned in substantial adjacent contact with one another; a closed cell adhesive foam matrix at least partially encapsulating the wires of the braid, and interposed and bonded between at least a portion of overlapping beams, and penetrating the outer surface of the braid via passageways at areas of intersection between the beams; and a cover telescoped over the braid reinforcement.

The invention also comphehends a method for producing wire-reinforced hose by the steps of (a) forming a self-supporting polymeric tube; (b) applying a coating of an expandable polymeric material onto the outer surface of the tube; (c) twining a tightly packed sheath of stranded wire reinforcement over the coated tube, interspaces being defined between the reinforcement and tube and between individual strands of the reinforcement; and (d) expanding the polymeric material into a cellular cushion matrix at least partially filling said interspaces.

BRIEF DESCRIPTION OF THE DRAWINGS

The invention will be more particularly described in its preferred embodiments by reference to the accompanying drawings in which like numerals designate like parts, and in which.

PREFERRED EMBODIMENTS OF THE INVENTION

Figure 1:
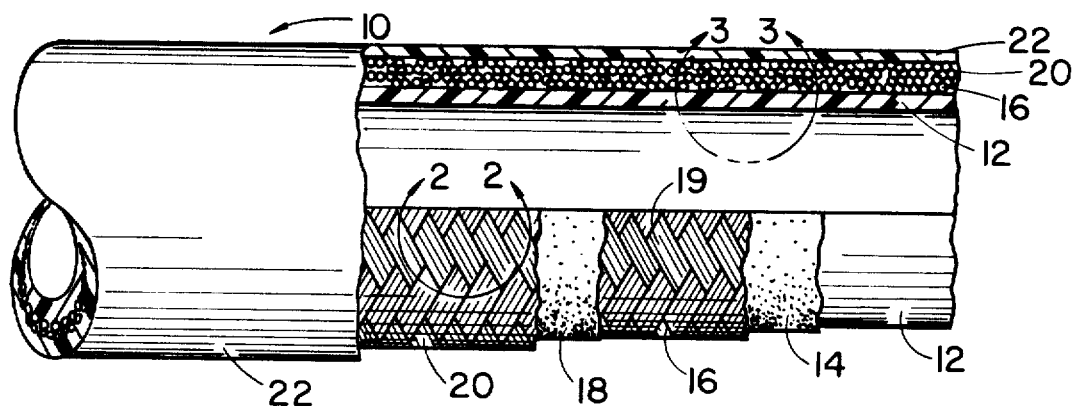
FIG. 1 depicts in partial cutaway, and in partial section a hose in accordance with the invention.

Referring first to FIG. 1, there is shown generally at 10 a cylindrically shaped hose in accordance with the invention, having a cylindrical core tube 12, a layer 14 representing a portion of the expanded polymeric cushion matrix, a first wire reinforcement layer 16 telescoped thereover, optional second layers of cushion matrix 18 and telescoped wire reinforcement 20, and an outer protective sheath or cover 22.

Figure 3:
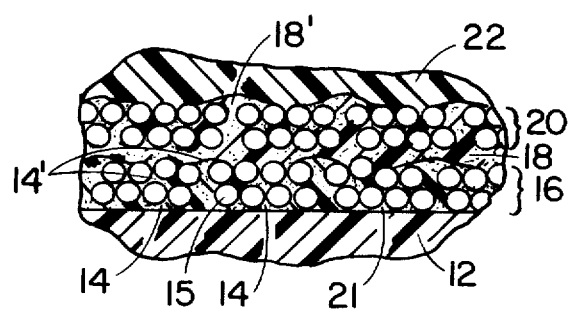
FIG. 3 is an enlarged view taken along 3—3 of FIG. 1, shown in partial, schematic cross section.

The tube 12 which is formed of a polymeric material is generally dimensionally stable or self-supporting such that it has substantial hardness and stiffness (modulus) at its outer surface, so that it does not flow or displace substantially into the vacant spaces formed along the undersurface of reinforcement layer 16. Preferably the tube has a durometer of from about 75 (Shore A) to about 63 (Shore D), more preferably from about 90 (Shore A) to about 55 (Shore D). These vacant spaces between the tube and undersurface of the braid pattern are shown in FIG. 3 as the interspace occupied by the innermost layer 14 of the expanded cushion matrix which, according to the method of the invention, is applied to occupy such interspace.

While the tube materials will be chosen to meet the specific end application, preferably polymeric materials are chosen from thermoplastic or rubber-like materials such as polyamid, polyester (e.g., Hytrel, a trademark of the Dupont Company), polyurethane, pre-cured natural or synthetic rubbers, and the like. Materials which normally do not have sufficient hardness or stiffness, such as certain grades of polyvinylchloride, uncured rubbers and the like may be employed if they have been compounded or treated to achieve sufficient stiffness or green strength to accept the wire reinforcement without substantial neckdown or other permanent deformation of the tube. Of course, certain softer materials can be employed if they are rendered temporarily hard, such as by freezing or otherwise treating the surface to increase the apparent modulus of the tube.

Although the invention provides benefits for hose of various dimensions, it has been found that impulse life is significantly improved (versus controls) in hoses of relatively small diameter, generally less than about one inch I.D. (inside diameter) and more particularly less than about ⅜ inch I.D. This advantage for smaller hose sizes is believed to result from the role the expanded matrix takes in cushioning the wire strands and beams subjected to maximum bending stresses.

Figure 4:
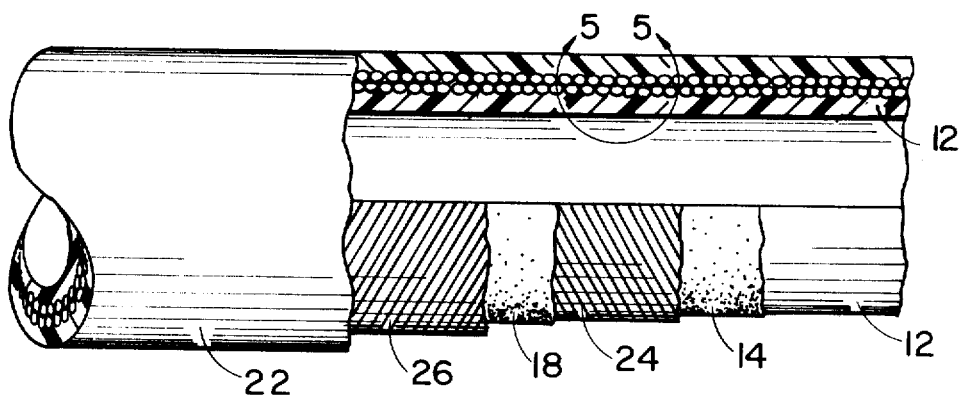
FIG. 4 is a view similar to FIG. 1 showing an alternative hose construction made in accordance with the invention.
Figure 5:
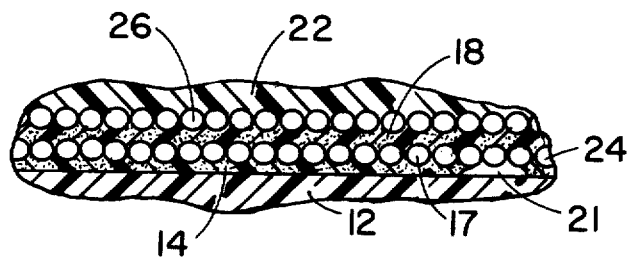
FIG. 5 is a partial, schematic sectional view along 5—5 of FIG. 4.

The wire reinforcement is formed of one or more telescoping layers formed over the tube. Typical configurations of stranded wire reinforcement contemplated by the invention include braid layers 16, 20 of FIG. 1, and spiral layers (of opposite hand) 24, 26 shown in FIG. 4, usually applied at the locked angle of about 54°. In either case the individual wire strands are tightly packed, meaning that individual wire strands 15, 17 are generally in adjacent substantial mutual contact with one another. However, some interstitial spacing within the reinforcement pack can be tolerated including, of course, the spacing resulting from overlap of individual beams 19 of the braid pattern, as well as minimal strand-to-strand spacing up to a few strand diameters. Typical braid patterns have beams consisting of from 12 to 1 ends (strands) per beam (also referred to as "per carrier" of the braiding machine). Wire strand diameters are typically from about 0.010 to about 0.015 inches but vary depending upon the hose diameter. The strands may be treated with adhesive to enhance bonding.

In accordance with the invention, the strands of the wire reinforcement sheaths or layers are at least partially encapsulated in a matrix 14, 14', 18, 18' of expanded polymeric material. By expanded is meant, in the usual sense of the term, that the polymeric material has, during processing, undergone a substantial increase in volume. This is usually effected by a foaming reaction in which an intercellular structure is formed. Most preferred are closed cell foams having a density preferably from about 0.75 to about 1.20, more preferably from about 0.85 to about 0.95 grams/cc of foam. Typical methods of generating the foam include incorporation of a foaming agent which liberates a foaming gas, e.g., $CO_2$ upon a change in pressure or temperature of the polymeric material incorporating the foaming agent, absorption of a material from the environment which triggers a foaming or expanding reaction, or any other known process.

The polymeric cushion or foam matrix at least partially fills interspaces between adjacent strands 15, 17 of the reinforcement layers, as well as interspaces existing between the overlapping beams 19 in a braid pattern and also between respective reinforcement sheaths if multiple sheaths are employed (such as between braid sheaths, 16 and 20, and between spiral layers 24, 26). Because the individual strands 15, 17 are generally circular in cross section, even adjoining strands which are in direct contact will define at the nip adjacent their point of mutual contact an interspace which the expanded polymeric matrix occupies.

The polymeric expanded matrix 14, 14', 18, 18' of the invention serves a number of important purposes. In one respect, it serves as an adhesive which bonds the tube to the reinforcement layers and/or cover. Most importantly, the expanded polymeric matrix or foam provides a cushioning effect between individual strands 15, 17, whether situated in a spiral layer or common beam of the braid, or between overlapping or adjacent layers or beams. The cushioning effect is also important when multiple sheaths of reinforcement are employed as at 20, 26; a cushion 18 is provided between the respective sheaths to reduce abrasion therebetween and the tendency of individual strands otherwise to fret. This all translates into a substantially increased impulse life for the hose. The adhesive nature of the foam matrix also improves greatly the kink resistance of the hose, i.e., reduces the minimum bend radius at which the hose kinks.

It is preferred that the expanded polymeric matrix substantially fills all the interspaces between individual wire strands and between overlapping beams or telescoping sheaths of reinforcement layer. However, some unfilled voids 21 may be present generally without appreciably compromising the effect provided by the expanded matrix. Depending upon the particular application and pressures experienced by the hose, duty cycle differential, pressure cycle, and the like, more or less porosity may be tolerated in the cushion matrix.

The matrix of expanded material also need not be uniform, although uniformity improves hose operation. As seen best in FIG. 2, the outermost braid of the hose in FIG. 1, broken apart for illustration, will generally have a layer 18' of expanded polymeric material in between overlapping beams 19. At points of intersection between beams, such as at 25, the expanded material may penetrate the outer surface of the braid and form a nodule or glob, also denoted 18'. A corresponding hump or glob 14' may be present on the innermost reinforcement sheath 16, as well. These masses of material do not adversely affect the quality of the hose and in fact promote more extensive encapsulation of the individual strands. Particularly at the intersection points 25 of the braid beams, they tend to serve as cushions or resilient masses which reduce fretting and abrasion during impulsing and pantographing of the hose in operation.

The outermost reinforcement sheath 20, 26 may be enshrouded by a protective cover 22 of material selected to satisfy the particular application, but most importantly to protect the outermost reinforcement layer. Any desired polymeric material such as thermoplastic or rubber materials, including natural and synthetic rubbers, polyvinylchloride, polyurethane, polyamid, polyester and the like, may be used. Normally it is preferred to employ thermoplastic cover materials which are self-curing. An additional layer of cushion matrix may also be applied over the outermost reinforcement layer and beneath the cover 22.

Figure 6:
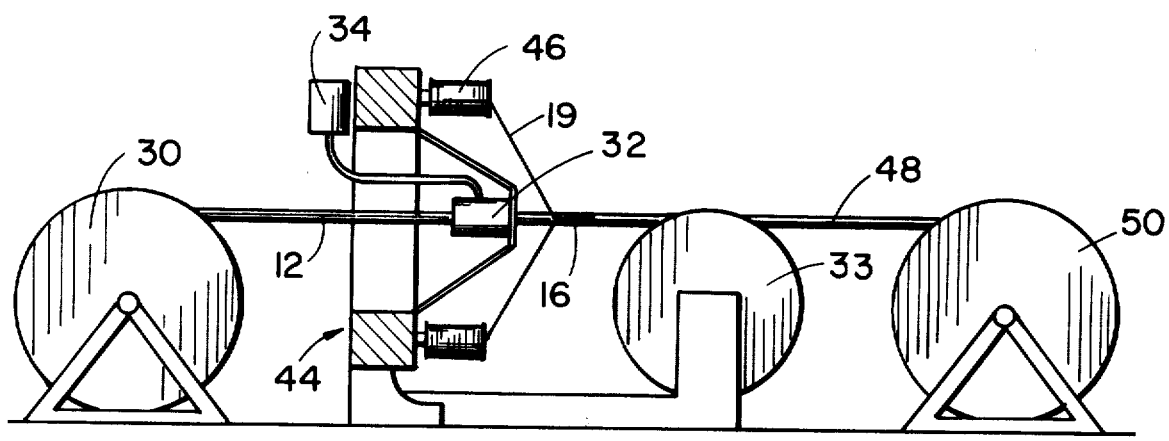
FIG. 6 is a schematic illustration of apparatus employed for partially constructing the hose of the invention.
Figure 7:
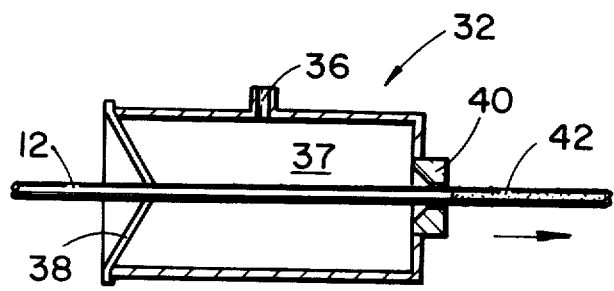
FIG. 7 is an enlarged, sectional view of the applicator for applying the expandable polymeric matrix to the hose tube.

The method of construction of the hose of FIG. 1 is illustrated in FIGS. 6 and 7. Core tube 12 may be extruded from a standard extruder (not shown), and stored on reel 30. The tube is then let off from reel 30 and pulled through polymeric applicator 31, the tension of which is controlled by capstan 33. The applicator 32, shown more clearly in FIG. 7, is of the wiping die type including a central chamber 37 which is supplied with expandable adhesive in liquid form from supply tank 34 through a connecting line via inlet 36. The tube passes through a plastic seal 38, into chamber 37 filled with the expandable adhesive, and exits through wiping die 40 carrying a relatively thin coat 42 of expandable adhesive on its outer circumference in accordance with the invention. Preferably, for most applications the coating 42 should be thick enough to promote the subsequent foaming action and therefore is preferably greater than about 0.005 inches thick. To achieve optimum coating thickness it is preferred that the adhesive supply in chamber 37 have a viscosity nearly that of molasses, in general preferably from about 6,000 to about 80,000 centipoises, as measured on a Brooksfield viscosimeter.

Rather than wiping the tube through a die opening, alternatively other means may be employed to apply the coating, either continuously or discontinuously, onto the tube outer surface. Thus, the tube could be dipped into a tank containing the expandable adhesive, the material brushed or sprayed onto the surface, or the like.

On to the thus coated tube is twined a tightly packed sheath of stranded wire reinforcement. In the example of FIG. 6, braider deck 44 of conventional design including a plurality of braider carriers 46 applies overlapping beams 19 of a plurality of individual wire strands 15 onto the coated tube to form a braided sheath layer 16.

Figure 2:
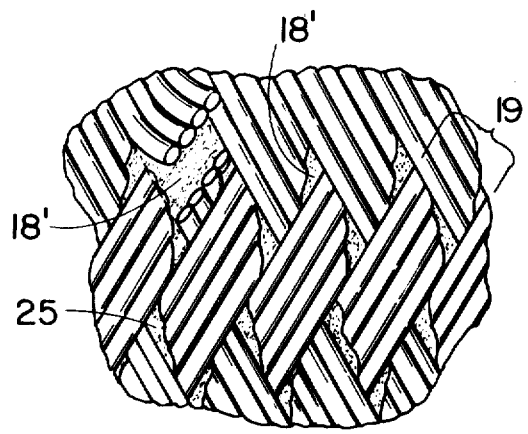
FIG. 2 is an enlarged partial view along 2—2 of FIG. 1, looking at the outer surface of the outermost braid reinforcement layer.

In the most preferred embodiment, the expandable adhesive is formed of a polymeric material which, upon exposure to ambient air, undergoes chemical reaction whereby the adhesive expands into a cellular structure which penetrates interspaces existing in the braid pack as hereinbefore defined, tending to at least partially encapsulate individual strands 15 of the wire reinforcement. A class of materials which has been found to satisfy this criteria are the moisture cure polyurethanes which include a reactive polyurethane prepolymer which reacts with moisture contained in the ambient air (higher humidities preferred) and undergoes the foaming reaction whereby $CO_2$ is released. A linear, thermoplastic (non-cross-linked) closed cell urethane cushion matrix 14 is simultaneously formed. As shown in FIGS. 2 and 3, some of the moisture cure polymeric material may ooze through interstices formed between adjoining and overlapping beams 19 to form globules or layers 14', (18') at the outer surface of the braid. In this preferred embodiment, the braided, coated tube 48 is wound up on reel 50 and stored in ambient air for a period sufficient to permit the moisture cure urethane to undergo expansion. This period of time may typically be from about 12 to about 24 hours.

As the expansion reaction takes place, the urethane matrix or foam swells and places the wire sheath 16, 24 in slight tension, which tightens the braid and tends to orient it in the preferred lock angle, and immobilizes it so that it has less chance to flex during further processing. The resultant hose with tube and wire reinforcement at least partially encapsulated in the expanded cushion matrix may be employed directly as a hose, or more preferably is provided with an outer protective cover 22, such as by a standard extrusion operation (not shown).

Alternatively, the expansion of the polymeric adhesive may be provided by the inclusion of a standard foaming agent, which may be activated to release the foaming gas by heating the reinforced tube in an oven (not shown), by pressure control, or by other means. The foaming takes place after the reinforcement sheath is in place telescoped over the tube, to thereby fill interspaces between wire strands and place the wire reinforcement sheath in tension, as previously described with respect to moisture cure urethanes.

Various expandable polymeric materials can be used in addition to the moisture cure urethanes (or other materials which cure by absorption of moisture or other material from the ambient air). The particular choice of expandable polymeric material will be dictated by the tube material, it being preferred that the expanded cushion matrix forms a bond between the wire reinforcement and the tube and/or the cover. Of course, using either the moisture cure polymeric materials or polymeric materials blended with foaming agents, one can add catalysts to speed the reaction with the moisture in the air, speed up the foaming reaction by releasing the foaming agents in situ by external heating, or the like.

As a specific example illustrating the invention and drawing comparisons against controls, the following is provided.

EXAMPLE

Two groups of three hoses each were constructed and tested against SAE 100R1 specification in accordance with the procedures of SAE J343. All six hose replications were ⅜ inch I.D. employing Hytrel (trademark) tubes of about 0.035 inch wall gauge, a single wire braid of 8 ends per beam of 0.010 inch gauge brass coated wire strands tightly packed and telescoped over the tubes, and an outer cover of about 0.030 inch wall gauge formed of Santoprene (a trademark of Monsanto Company identifying a cross-linked copolymer of EPDM and propylene). The Group I hoses also employed an expanded urethane cushion matrix in accordance with the invention, applied as a single uniform coating layer of about 0.005 inches thickness over the Hytrel tube per the procedure discussed in respect to FIGS. 6 and 7. The coating material used was Chempol 35-0014, a moisture cure polyurethane prepolymer having a free isocyanate content of from 7-10 weight percent manufactured by Freeman Corporation.

After the coating was applied to the tube and the braid applied over the coated tube, the braided hose was stored for 18 hours at about 25 percent relative humidity, during which time the expansion reaction took place and the cushion matrix formed as previously discussed. Thereafter, the Santoprene cover was applied over a braid and cushion matrix resembling that shown in FIG. 2. The hose was set at this point, requiring no additional curing step.

The Group II hoses represented the controls which were identical with the Group I hoses with the exception that no adhesive/cushion matrix was employed.

The ends of the hoses were fitted with standard hydraulic couplings having a ferrule crimp O.D. (outside diameter) of 0.67 inches, and a crimp length of 1 inch. The coupled hoses were made to assume a curve defined by a 5 inch bend radius. The temperature was held at 250° F. and the hoses impulsed at 2812 p.s.i.

The hoses of both Group I and Group II had test burst pressures of from 13,000–13,500 p.s.i., and equivalent length, O.D. and twist changes (if any) at 2250 p.s.i.

Each of the three hose samples of Group I endured 557,307 impulse cycles without failure, the testing having been discontinued at that point. Each of the three control samples of Group II sustained hose body failures respectively at 51,044, 69,137 and 110,557 impulse cycles, dramatically evidencing superior impulse lives for the Group I samples of the invention, which passed SAE 100R1 performance specifications.

Similar tests were performed on hoses having 1 inch I.D.'s. Both the hoses of the invention and the controls were removed from the test with the same number of impulse test cycles, prior to failure.

Similar tests were also performed except the ⅜" I.D. hose samples were reinforced with aramid fiber braid instead of wire braid. The hoses using the polymeric cushion matrix and the controls performed substantially the same.

While certain representative embodiments and details have been shown for the purpose of illustrating the invention, it will be apparent to those skilled in this art that various changes and modifications may be made therein without departing from the spirit or scope of the invention.

What is claimed is:

1. A hose comprising an inner polymeric tube, a substantially tightly packed stranded wire reinforcement telescoped thereover, and an expanded polymeric cushion matrix at least partially encapsulating strands of the reinforcement and filling at least a portion of interspaces between adjacent strands and filling at least a portion of interspaces between the reinforcement and the polymeric tube.

2. The hose of claim 1 wherein the polymeric cushion matrix fills substantially all the interspaces between adjacent strands.

3. The hose of claim 1 wherein the reinforcement is in the form of wire braid, a portion of the expanded polymeric cushion matrix being interposed between overlapping beams of the braid.

4. The hose of claim 1 wherein the reinforcement is formed of multiple telescoped annular layers, a portion of the expanded polymeric cushion matrix being interposed between such annular layers.

5. A hose comprising an inner thermoplastic tube having a durometer of at least about 75 (Shore A), a tightly packed stranded wire reinforcement telescoped thereover, and an expanded cellular polymeric cushion matrix positioned between the tube and reinforcement and filling at least a portion of interspaces between adjacent strands of the reinforcement.

6. The hose of claim 5 having an outer protective cover positioned over the reinforcement/cushion matrix.

7. The hose of claim 5 wherein the cushion matrix is a closed cell foam having a density of from about 0.75 to about 1.20 grams/cc of foam.

8. The hose of claim 5 wherein the cushion matrix is formed of a moisture cure prepolymer.

9. A kink-resistant high pressure hose comprising:
   an inner thermoplastic tube having a durometer of at least about 75 (Shore A);
   at least one wire braid reinforcement layer telescoped over the tube and whose beams are composed of wire strands positioned closely adjacent one another;
   a polymeric foam layer interposed between the tube and undersurface of the braid reinforcement layer and at least partially filling interspaces between overlapping beams and between adjacent strands of a beam; and
   a cover positioned over the braid reinforcement.

10. The hose of claim 9 wherein the foam layer forms a bond with the tube.

11. The hose of claim 9 wherein the cushion matrix is a closed cell foam having a density of from about 0.75 to about 1.20 grams/cc of foam.

12. The hose of claim 9 wherein the cushion matrix is formed of a moisture cure urethane.

13. A hydraulic thermoplastic hose comprising:
   a thermoplastic tube of at least about 75 (Shore A) durometer with a maximum internal diameter of about 2 inches;
   at least one wire braid reinforcement layer telescoped over the tube and free from embedment in the outer surface of the tube, the beams of the braid formed of multiple strands of wire positioned in substantial adjacent contact with one another;
   an adhesive foam matrix at least partially encapsulating wires of the braid, and interposed and bonded between at least a portion of overlapping beams, and penetrating the outer surface of the braid via passageways at areas of intersection between beams; and
   a cover telescoped over the braid reinforcement.

14. The hose of claim 13 wherein the reinforcement is formed of multiple telescoped annular layers, a portion of the expanded cushion matrix being interposed between such annular layers.

15. The hose of claim 13 wherein the cushion matrix is a closed cell foam having a density of from about 0.75 to about 1.20 grams/cc of foam.

16. The hose of claim 13 wherein the cushion matrix is formed of a moisture cure urethane.

17. A hose comprising an inner polymeric core tube, a substantially tightly packed wire braid reinforcement telescoped thereover, the braid being formed of overlapped beams formed of multiple strands of wire, and an expanded polymeric cushion matrix at least partially encapsulating strands of the reinforcement, filling at least a portion of interspaces between adjacent strands of each beam, and being interposed between overlapping beams of the braid layer.

18. The hose of claim 17 wherein multiple braid layers are employed, and the expanded polymeric cushion matrix fills at least a portion of the space between such multiple braid layers.

19. A hose comprising an inner polymeric tube, a plurality of telescoped annular reinforcement layers formed thereover, one of said annular reinforcement layers being formed of tightly packed wire strands, and an expanded polymeric cushion matrix at least partially encapsulating strands of said one annular reinforcement layer, filling at least a portion of interspaces between adjacent strands, and a portion of the expanded polymeric cushion matrix being interposed between such said plurality of annular reinforcement layers.

20. The hose of claim 19 wherein the polymeric cushion matrix fills substantially all of said interspaces between adjacent strands.

* * * * *